United States Patent [19]
Miller

[11] 3,810,019
[45] May 7, 1974

[54] MULTIFREQUENCY COMMUNICATION SYSTEM FOR FADING CHANNELS

[75] Inventor: Chauncey S. Miller, Palos Verdes Peninsula, Calif.

[73] Assignee: Sperry Rand Corporation, Great Neck, N.Y.

[22] Filed: Sept. 25, 1972

[21] Appl. No.: 291,880

[52] U.S. Cl. ........................ 325/40, 325/59, 325/65, 340/171 PF
[51] Int. Cl. ............................................... H04l 5/06
[58] Field of Search ............. 325/39, 40, 56, 59, 60, 325/65, 41, 42; 178/66 R, 67, 51, 53.1, 50; 340/171 R, 171 PF

[56] References Cited
UNITED STATES PATENTS

| | | | |
|---|---|---|---|
| 3,035,250 | 5/1962 | Durkee et al. | 340/171 PF |
| 3,450,840 | 6/1969 | Vogt | 325/39 X |
| 3,530,434 | 9/1970 | Stites et al. | 340/171 PF |
| 3,582,895 | 6/1971 | Abramson et al. | 340/171 PF |

*Primary Examiner*—Benedict V. Safourek
*Attorney, Agent, or Firm*—Howard P. Terry

[57] ABSTRACT

A communication system particularly for underwater communication includes a transmitter and a receiver. An oscillator in the transmitter generates a plurality of signals each having a unique frequency. A network selects predetermined combinations of signals from this plurality, each selected combination defining a data symbol to be transmitted. The assignment of the frequency groups with respect to the data symbols to be transmitted is achieved via a Hadamard matrix. During each data symbol transmission interval a gate selects the combination of frequency signals corresponding to the symbol to be transmitted. The signals in the combination are added and transmitted by a transducer. The receiver includes a bank of filters each tuned to one of the plurality of frequency signals generated in the oscillator bank. The outputs of the filters are envelope detected and applied to a frequency code selector. In each data symbol transmission interval, the frequency code selector combines the detected outputs from the filter bank in accordance with the Hadamard transformation matrix to provide a plurality of groups of signals each corresponding to a symbol in the system symbol repertoire. Each group of signals are summed and the resulting signals applied to a decision circuit that selects the maximum therefrom. The output of the decision circuit which is representative of the transmitted symbol is applied to a suitable readout.

7 Claims, 6 Drawing Figures

MULTIFREQUENCY COMMUNICATION SYSTEM FOR FADING CHANNELS

BACKGROUND OF THE INVENTION

1. Field of the Invention

The invention relates to multifrequency communication systems for fading channels and more specifically to underwater communication systems for conveying digital or symbolic data.

2. Description of the Prior Art

Frequency shift keying communication systems are well known in the art that utilize frequency diversity to combat signal fading over the communication medium. Such systems operating at acoustic frequencies are known for underwater communication and similarly, systems operating at radio frequencies for transmission via the ionosphere are also known. Examples of such underwater communication systems may be found in U.S. Pat. No. 3,493,866 issued Feb. 3, 1970, "Frequency Stepped Phase Shift Keyed Communication System" by C. S. Miller, assigned to the assignee of the present application; U.S. patent application Ser. No. 808,020 filed Mar. 17, 1969, "Underwater Communication System" by D. E. Jackson and I. M. Kliman, assigned to the assignee of the present application and the article "Diver Telemetry System" by H. B. Gillis et al, pages 25–30 of the *Sperry Engineering Review*, Vol. 19, No. 3, 1966. Such systems are normally configured for the transmission of binary data, i.e., binary 1 or binary 0. In frequency shift keying systems in a particular bit interval, a pulse of a first predetermined frequency may be transmitted to represent binary 0 and a pulse of a second predetermined frequency may be transmitted to represent a binary 1. Because of multiple transmission paths through the medium as well as other phenomena that exist in such systems, fading of the transmitted tones may occur causing errors in the transmitted data. Since such fading is a function of the transmitted frequency, different frequencies will exhibit different fading characteristics. It is known in such systems, that in order to combat the channel fading characteristics, a plurality of discrete frequency tones may be transmitted to represent each of the data symbols to be communicated. In order to enhance the distinguishability amongst the data symbols of the system, the groups of frequencies representing the respective symbols are chosen to be disjoint, i.e., no frequency is utilized in representing more than one symbol.

Configurations of this type are conventionally known as frequency diversity systems wherein should one or more tones fade at a given time, a sufficient number of the other tones will be received such that the symbols of the system data set can be distinguished from one another. The performance of such systems is characterized by a number of parameters, namely data rate, frequency bandwidth, probability of error per bit and signal to noise ratio. It is known that inter-relationships exist amongst these parameters. For example, an increase in data rate requires an increase in frequency bandwidth. Increasing the frequency diversity of the system decreases the probability of error per bit but increases the required frequency bandwidth. The signal to noise ratio for the system may be increased by increasing the transmission interval per bit which in turn results in a decrease in the system data rate.

It will be appreciated from the foregoing that when it is desirable to improve system performance with respect to a particular parameter, performance will be degraded with respect to other parameters. It is a desideratum of system design to effect improvements with regard to the performance parameters without suffering consequent degradations with respect thereto.

SUMMARY OF THE INVENTION

The invention has as its primary object to provide a multifrequency communication system for fading channels wherein when three of the four performance parameters are rendered equal to those of a conventional frequency diversity system, the fourth parameter will exhibit a significant improvement over the prior systems. This improved system is achieved by assigning to each data symbol of the data symbol set for the system a group of frequencies selected from the frequency set of the system where the same frequency may be used in more than one symbol representing group. The assignment of frequencies to the symbols is performed in accordance with a Hadamard matrix of which at least one column has more than one frequency representing element. In a preferred embodiment, the matrix is selected equivalent to a Hadamard matrix of normal form. In this manner, equal weight coding is achieved which greatly simplifies the design of the receiver.

DESCRIPTION OF THE PREFERRED EMBODIMENT

Figure 1:
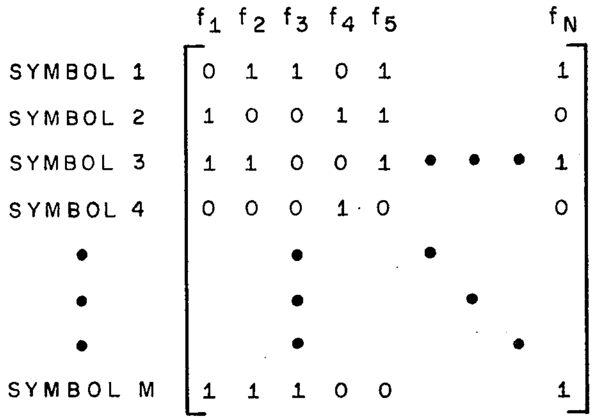
FIG. 1 is a diagram of a modulation matrix for assigning the discrete frequencies of the system to the data symbol set to be communicated.

Referring to FIG. 1 a typical modulation matrix for instrumenting a communication system in accordance with the invention is illustrated. The system utilizes N discrete frequencies $f_1$ through $f_N$ to transmit M symbols, i.e., symbol 1 through symbol M as indicated by the legends. The frequencies may be chosen to satisfy various constraints of the communication system such as operating bandwidth, transmitting and receiving transducer requirements, doppler spread protection and independent fading for each of the frequencies. The frequencies are combined in accordance with the matrix to transmit one of the M symbols every T seconds where the duration of symbol transmission is T seconds. Accordingly, the spacing between the frequencies $f_1, f_2, \ldots, f_N$ should be no closer than 1/T hertz to avoid spectral overlap.

Each of the M data symbols is represented and transmitted by a signal which in the preferred embodiment of the invention comprises the sum of N/2 sinusoids where N is an even number, each sinusoid being of equal amplitude and having a frequency chosen from the system frequency set of N frequencies. The N frequencies are allocated to the M symbols in accordance with the modulation matrix of FIG. 1 as follows. For each symbol, a 1 in a frequency column represents the inclusion of that frequency and a 0 in a frequency column represents the exclusion of that frequency. Thus, it is appreciated, for example, that symbol 1 comprises the sum of the frequencies $f_2, f_3, f_5 \ldots, f_N$. For reasons to be later discussed, each N element row of the modulation matrix includes N/2 ones and N/2 zeros corresponding to the transmission of N/2 sinusoids. Such a modulation format is said to be "equal weight" since each symbol is represented by the same number of frequencies. An equal weight modulation format results in significant simplifications with regard to the system receiver in a manner to be later explained.

Conveniently, the transmitted waveform for the $i^{th}$ symbol may be represented by $$S_i(t)=\sum_{j=1}^{N} w_{ij} \sin 2\pi f_j t \quad (1)$$

for the signalling interval $T_i \leq t \leq T_f$, $T_f - T_i = T$ and where the $W_{ij}$ are the entries in the M × N modulation matrix of FIG. 1. Each row of the matrix is therefore a code word of ones and zeros that determines which frequencies are transmitted to represent the symbol corresponding to the row. The modulation matrix represented in FIG. 1 may be derived in accordance with the invention from a Hadamard matrix, for example a Hadamard matrix in normal form, in a manner to be explained.

It is appreciated from the foregoing that one of M distinct information symbols is transmitted every T seconds. If $M=2$, the system is a binary communication system with one symbol a "mark" and the other symbol a "space." In embodiments where M is greater than 2, the transmission rate of such systems in terms of binary digits is $R=T^{-1} \log_2 M$ bits/second.

Figure 2:
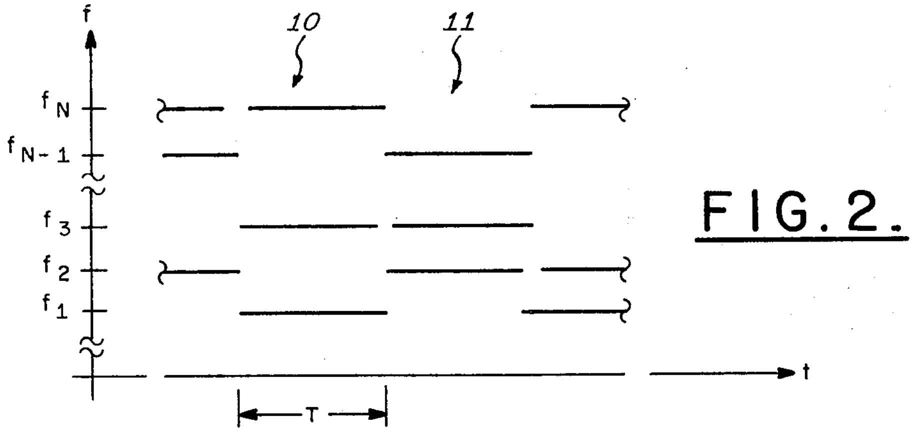
FIG. 2 is a diagram useful in explaining the operation of the invention.

Referring to FIG. 2, a graph of frequency versus time schematically exemplifies the basic transmission mode of the system. At each bit time of duration T, a group of frequencies is selected in accordance with the modulation matrix of FIG. 1 for transmitting a symbol during that time period. For example, in the time period 10, frequencies $f_1, f_3$ and $f_N$ are selected and in time period 11 frequencies $f_2, f_3$ and $f_{N-1}$ are selected. It is thus appreciated, that in time interval 10 a particular symbol represented by the three frequencies is transmitted and in time interval 11 another symbol is transmitted represented by the three frequencies illustrated therein. It is noted that the same frequency may be included within the frequency groups representing different symbols.

Figure 3:
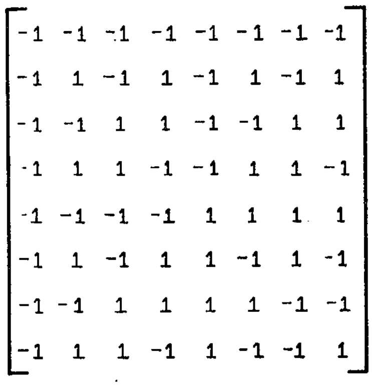
FIG. 3 is a diagram of a typical Hadamard matrix in normal form which may be utilized in deriving the modulation matrix of FIG. 1.

Referring to FIG. 3, an 8 × 8 Hadamard matrix in normal form is illustrated. Hadamard matrices are defined and discussed in the textbook *Digital Communications with Space Applications* by S. Golomb published by Prentice Hall in 1964, pages 53–58. Briefly, a Hadamard matrix is a square matrix whose elements are plus ones and minus ones with the property that its rows are orthogonal, i.e., the sum of the element by element products of any two rows is zero. In the normal form of a Hadamard matrix, the uppermost row and the left most column are all plus ones or all minus ones. In the normal form, all of the remaining rows of a Hadamard matrix each has an equal number of ones and minus ones. The Hadamard matrix in normal form illustrated in FIG. 3 may be utilized in deriving a modulation matrix of the type illustrated in FIG. 1 for a communication system utilizing 8 distinct frequencies and up to 14 distinct data symbols.

Figure 4:
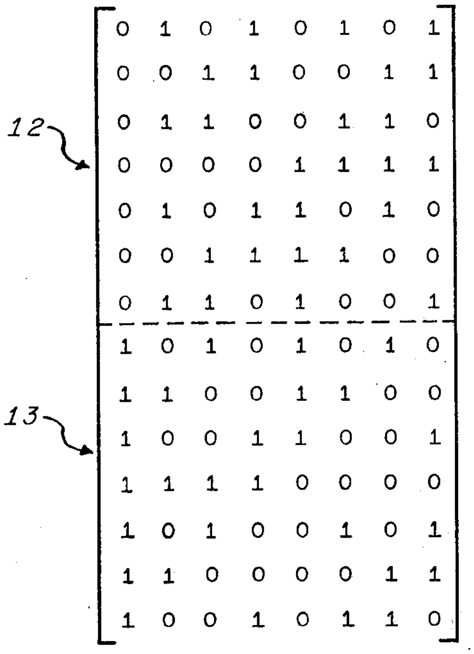
FIG. 4 is a diagram illustrating modifications made to the Hadamard matrix of FIG. 3 in deriving the modulation matrix of FIG. 1.

Referring to FIG. 4, the modulation matrix of the type illustrated in FIG. 1 and derived specifically from the Hadamard matrix of FIG. 3 is illustrated. The modulation matrix of FIG. 4 is derived from the Hadamard matrix of FIG. 3 by:

1. changing the minus ones in the matrix to zeros;
2. deleting the one row that is now all zeros or all ones; and
3. appending to the N-1 rows of the matrix obtained in step 2 the N-1 complements of these rows where a complement of a row is constructed by replacing zeros with ones and ones with zeros. Portion 12 of FIG. 4 shows the matrix of FIG. 3 altered in accordance with steps 1 and 2 above and portion 13 of FIG. 4 illustrates the complements constructed in accordance with step 3. Thus, the matrix of FIG. 4 illustrates a specific modulation matrix of the type exemplified in FIG. 1 where each column represents a distinct frequency and each row represents a discrete data symbol. It will be appreciated that for a system utilizing N frequencies, the number of symbols M that may be represented by these frequencies in accordance with the invention is less than or equal to 2(N-1).

Figure 5:
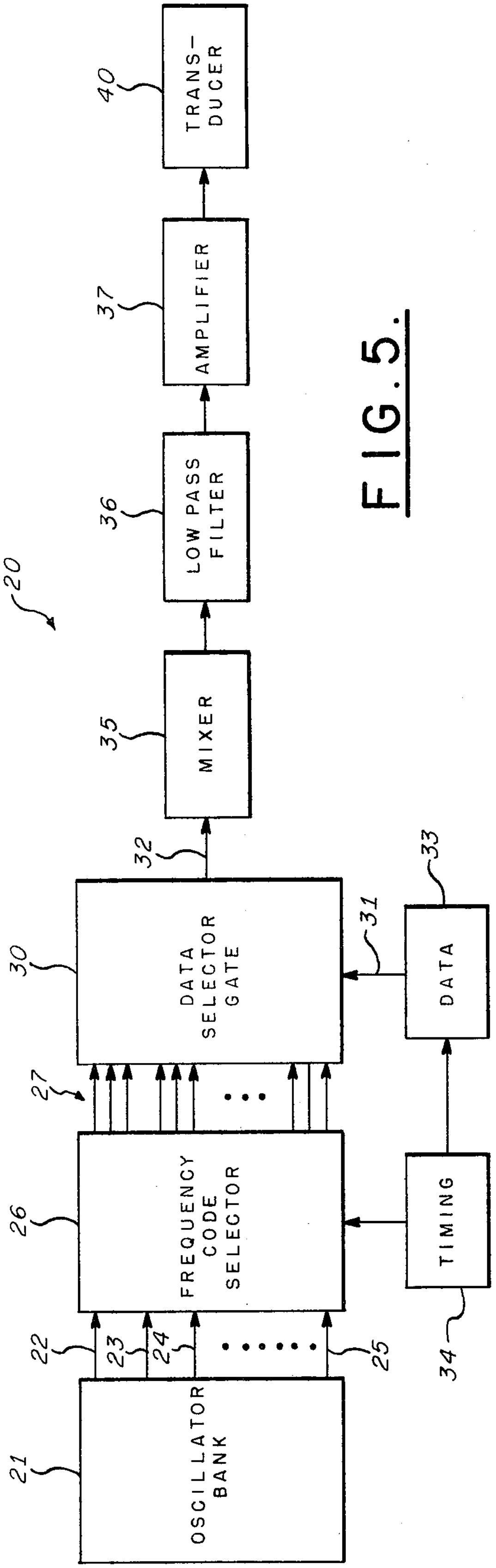
FIG. 5 is a block diagram illustrating a transmitter for use in the present invention.

Referring now to FIG. 5, a transmitter 20 for selectively transmitting the data symbols or data items of the system in accordance with a modulation matrix of the type illustrated in FIGS. 1 or 4 is illustrated. The transmitter 20 includes an oscillator bank 21 that provides a plurality of signals at different frequencies over a plurality of lines respectively. For example, the frequencies $f_1, f_2, f_3$ and $f_N$ of FIG. 1 may be provided respectively on lines 22, 23, 24 and 25. Typically, the oscillator bank 21 may generate around 32 frequencies. The oscillator bank 21 may be of the type discussed in said Ser. No. 808,020.

The frequency signals from the oscillator bank 21 are applied to a frequency code selector 26. The frequency code selector 26 is basically a conventional switching matrix which selects those frequencies from the oscillator bank 21 that define the variety of data symbols of the system in accordance with the system modulation matrix of the type illustrated in FIG. 1 or FIG. 4. The frequency code selector 26 groups these signals in accordance with the symbols to be transmitted and provides these grouped signals on the lines 27. Thus it is appreciated that in a system where the oscillator bank 21 provides, for example, 32 frequencies and each symbol is represented by 16 of these frequencies selected in accordance with the modulation matrix of the system, the lines 27 would be arranged in groups of 16 where each group provides the frequencies representative of the associated symbol in accordance with the associated row of the modulation matrix as explained with regard to FIG. 1.

The groups of signals on the leads 27 are applied to a data selector gate 30 which selects one of the groups in accordance with a data signal on a lead 31, sums the frequencies in the selected group and provides the sum on a lead 32. A data block 33 provides the signal on the lead 31 in accordance with the data item or symbol to be transmitted in a bit interval. Timing circuits 34 provide conventional timing signals to the frequency code selector 26 and to the data block 33 to provide transmissions as generally illustrated in FIG. 2. The data block 33 and the timing circuits 34 are conventional components and may be instrumented generally in the manner discussed in said Ser. No. 808,020.

The symbol signal on the lead 32 provided by the data selector gate 30 is passed to a mixer 35 which converts the frequencies in the signal on the line 32 to frequencies suitable for acoustic transmission. The block 35 is considered as including the conventional components normally utilized in performing this conventional function. These signals are passed through a low pass filter 36 so as to remove the upper sideband. The lower sideband signals are then amplified in a conventional amplifier 37 which passes the signal to a suitable transducer 40 which launches the acoustic signal into the water.

Figure 6:
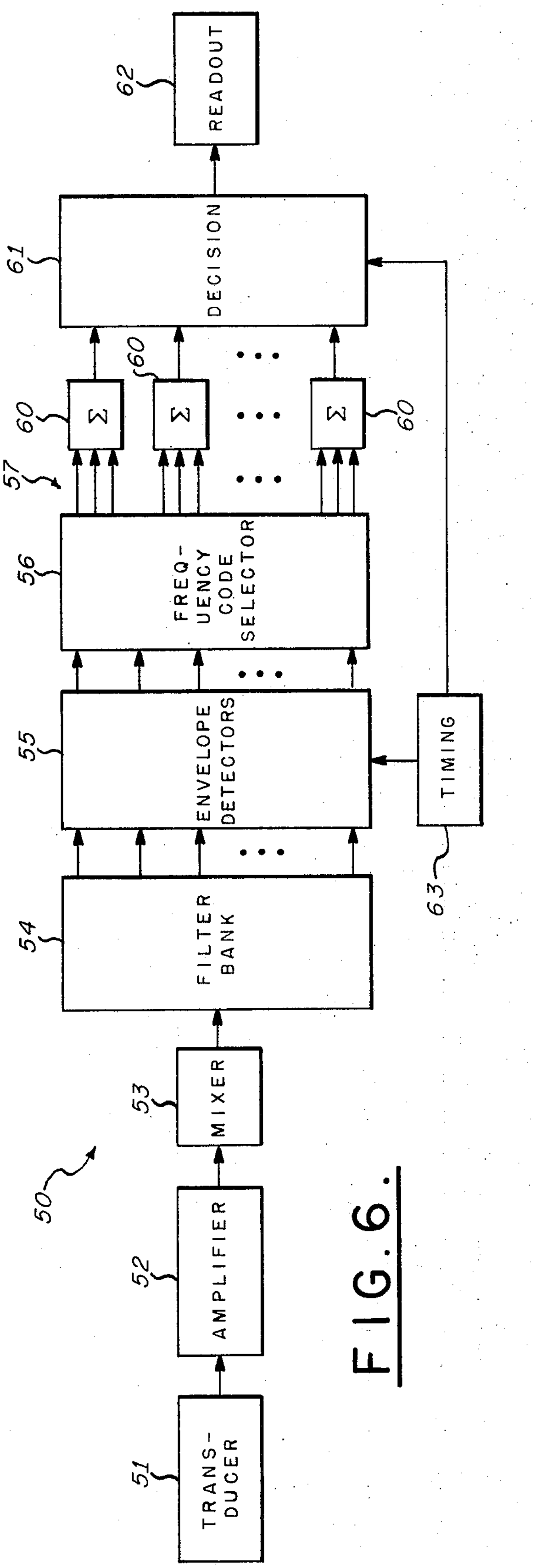
FIG. 6 is a block diagram illustrating a receiver useful in practicing the present invention.

Referring now to FIG. 6 a typical receiver 50 useful in practicing the invention is illustrated. The signal from the transducer 40 of FIG. 5 is received at a suitable transducer 51, amplified in an amplifier 52 and converted in a mixer 53 to frequencies suitable for use in the electronic system. The block 35 is considered as including the conventional components normally utilized in performing this conventional function. The signal from the mixer is applied to a filter bank 54. The filter bank 54 comprises N filters corresponding to the N frequencies provided by the oscillator bank 21 of FIG. 5. The filter bank 54 may comprise conventional filtering circuits or may be implemented in a known manner by a Fast Fourier Transform computation.

The N outputs from the filter bank 54 corresponding to the N frequencies of the system are applied, respectively, to envelope detectors 55. Each envelope detector may conveniently be either a conventional linear or square law type that provides a pulse of amplitude corresponding to the power of the sinusoidal signal passing through the associated filter of the filter bank 54. The N outputs from the envelope detectors 55 are applied to a frequency code selector 56.

The frequency code selector 56 may be configured in a manner similar to that of the frequency code selector 26 of FIG. 5 and may comprise a switching matrix that selectively groups the outputs from the envelope detectors 55 in accordance with the frequency groupings that comprise each symbol as previously described with respect to FIG. 5 in accordance with the modulation matrix as explained with regard to FIGS. 1 and 4. These grouped signals are applied on grouped leads 57 where the groups correspond to the M data symbols of the system, respectively. Each group of signals on the leads 57 are applied to a respective summing amplifier 60. The outputs of the summing amplifiers 60 are applied to a decision circuit 61 which compares the outputs thereof and passes a readout signal to a readout means 62 depending on which signal from the amplifiers 60 predominates.

It is thus appreciated that the frequency code selector 56, the summing amplifiers 60 and the decision circuit 61 implements the following decision algorithm. The frequency code selector 56 and the summing amplifiers 60 compute $$r_i=\sum_{j=1}^{N} w_{ij} P_j,\ i=1, 2, \ldots, M \qquad (2)$$

for each of the M symbols, where $P_1, P_2, \ldots P_n$ are the outputs of the envelope detectors 55 respectively, and the decision circuit 61 decides that the $k^{th}$ symbol was transmitted if $r_k$ is the largest of the $r_i$'s. This decision operation thus involves summing the sampled filter output power of the frequencies corresponding to those transmitted for a given input signal. The $w_{ij}$ are the entries in the modulation matrix of FIG. 1 or FIG. 4 which are available in the frequency code selector 56. The decision circuit 61 supplies the readout 62 with an M-ary symbol every T seconds.

The receiver 50 includes timing circuits 63 for providing the conventional timing signals required in the operation of the receiver. It will be appreciated that the circuits of the receiver 50 may be similar to corresponding circuits of said Ser. No. 808,020.

The decision algorithm embodied by the blocks 56 and 60 is instrumented in parallel fashion. It will be appreciated that the decision algorithm may be serially instrumented as well. A conventional table look-up arrangement may be utilized to selectively group the inputs to the block 56 in accordance with the groups of frequencies of the data symbols and serially provide these groupings of signals on output leads from the block. The signals on these output leads would be summed and applied to a circuit for storing the maximum of the serially occurring summed signals. Thus, at the end of a decision interval, the maximum of the signals would be in storage as required.

It will be appreciated from the foregoing that preferably modulation matrices should be utilized that yield equal weight codes, i.e., an equal number of frequencies selected for each symbol. This results in a receiver that operates in balanced fashion, that is, the receiver makes its decision by determining the largest of M numbers that are obtained without information with regard to signal or noise levels at any frequency (no thresholding), information that requires complex and hense costly auxiliary circuitry to obtain. The receiver does not make a decision as to the transmission of a tone at every one of the N frequencies and then use a conventional decoder for the final decision of the transmitted waveform. Such a procedure is detrimental to system performance in the presence of fading.

As previously discussed, the present invention provides significant improvements over conventional frequency diversity systems. The "diversity" of such prior art systems is the number of distinct frequencies used to define each of the data symbols to be transmitted. For example, if two distinct frequencies are utilized to represent each character, the system is said to have a diversity of two. The diversity of the system is related to the distinguishability of received characters in the presence of fading and determines the probability of error per bit.

The effective diversity of the present signalling technique is half the minimum distance between rows of the modulation matrix where the distance between two rows is defined as the number of places in which they disagree. In accordance with the properties of Hadamard matrices in normal form, any two rows in the modulation matrix will have a distance of N/2 unless they are complements in which case the distance between the rows is N. Thus systems instrumented in accordance with the present invention have an effective diversity of N/4.

It will thus be appreciated with regard to the modulation matrix of FIG. 4 that a system instrumented in accordance therewith will have a diversity of two. In a conventional frequency diversity system with no frequency overlap between symbols, an eight tone system with a diversity of two would be capable of transmitting four characters. As previously described, the system utilizing the modulation matrix of FIG. 4 which has eight tones and provides a diversity of two is capable of transmitting 14 characters. Thus, a system instrumented in accordance with the invention having the same bandwidth and diversity as a prior art system will have a lower probability of error per bit since the system is capable of a significantly higher data rate.

If a system in accordance with the invention, and a prior art frequency diversity system have the same data rate and bandwidth, the symbol duration for the system instrumented in accordance with the invention may be made longer than that for the conventional system since more binary digits per data symbol are provided by the inventive techniques. Lengthening the symbol duration increases the signal to noise ratio and hence the present invention enjoys another significant advantage over the prior art system. In a similar manner, in comparing a system instrumented in accordance with the invention and a prior art frequency diversity system with all but one performance parameter maintained the same, the system instrumented in accordance with the invention provides a significant improvement with regard to the parameter compared relative to the conventional system.

It will be appreciated that in order to obviate the effects of long term multipath disturbances, the selected frequency groups may be periodically and cyclically changed in accordance with the teachings of said U.S. Pat. No. 3,493,866 and said patent application Ser. No. 808,020. Additionally, acquisition, synchronization and doppler compensation of the received signal may be achieved in the manner described in said U.S. Pat. No. 3,493,866 or said patent application Ser. No. 808,020. It is furthermore appreciated, that the filter bank 54 of FIG. 6 may be implemented in a known manner by a Fast Fourier Transform computation.

It will be appreciated from the foregoing that although it is preferred to derive the system modulation matrix from a Hadamard matrix in normal form, non-normal form Hadamard matrices may also be utilized to derive systems superior to the prior art providing that at least one column of the final modulation matrix has a plurality of frequency representing elements therein. It is known from the mathematical theory, as discussed in the said Golomb textbook, that two Hadamard matrices are equivalent if one matrix may be derived from the other by such operations as interchanging rows, interchanging columns, changing the sign of every element in a row and changing the sign of every element in a column. It will be appreciated in practicing the preferred embodiments of the invention utilizing Hadamard matrices in normal form that Hadamard matrices equivalent thereto may also be utilized. When the order N of a normal form Hadamard matrix is a power of 2 the rows of the matrix represent a Reed-Muller code as discussed on page 51 of the said Golomb textbook. The Hadamard matrix modified in accordance with the invention as described above yields the bi-orthogonal Reed-Muller codes with the all zeros and all ones code words deleted. Thus it is appreciated that the class of Reed-Muller codes may also be utilized in practicing the invention and hence is within the scope thereof.

The Hadamard matrix is a convenient tool for deriving multifrequency communication systems that are superior in performance to the known frequency diversity systems. It will be appreciated that other matrices that do not fall within the rigorous mathematical definition for a Hadamard matrix as discussed in the said Golomb textbook may also be utilized in practicing the invention. Thus, for the purpose of this application, the term Hadamard matrix is defined to include any square matrix with binary elements (frequency including and frequency excluding) such that the correlation between all pairs of rows is zero where correlation is defined as the number of agreements minus the number of disagreements between the corresponding elements of a pair of rows.

It is furthermore appreciated that Hadamard matrices as defined in the mathematics and as herein defined may be altered slightly so as not to come within the purview of the mathematically rigorous definitions but would provide multifrequency signalling systems with performance substantially as favorable as the unaltered matrix would provide. Such an alternation might be achieved, for example, by changing two elements in a row of the matrix. It is to be appreciated, therefore, the matrices that have substantially the Hadamard property of orthogonality between the rows or, as discussed above, the near zero correlation between all pairs of rows, are included within the purview of the invention.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A system for communicating data items comprising transmitter means, receiver means, transmitting and receiving transducer means coupled to said transmitter and receiver means respectively, said transmitter means comprising oscillator bank means for providing a plurality of signals, each signal having a unique frequency, transmitter switching means for selecting groups of signals from said plurality of signals, said groups representative of said data items respectively, said groups of signals being associated with said respective data items in accordance with a substantially Hadamard matrix, at least two said groups including the same signal, means for energizing said transmitting transducer means with a signal corresponding to the combined signals in a selected group, said receiver means comprising filter bank means responsive to said receiving transducer means for filtering the received signal in accordance with each of the frequencies provided by said oscillator bank means and providing filtered signals in accordance therewith, receiver switching means for selecting groups of said filtered signals in accordance with said Hadamard matrix, means for combining each selected group of filtered signals, and means for comparing the combined groups of filtered signals with respect to each other for determining the data item transmitted.

2. A system for communicating data items comprising transmitter means, receiver means, transmitting and receiving transducer means coupled to said transmitter and receiver means respectively, said transmitter means comprising oscillator bank means for providing a plurality of signals, each signal having a unique frequency, transmitter switching means for selecting groups of signals from said plurality of signals, said groups representative of said data items respectively, said groups of signals being associated with said respective data items in accordance with a matrix equivalent to a substantially Hadamard matrix in normal form, means for energizing said transmitting transducer means with a signal corresponding to the combined signals in a selected group, said receiver means comprising filter bank means responsive to said receiving transducer means for filtering the received signal in accordance with each of the frequencies provided by said oscillator bank means and providing filtered signals in accordance therewith, receiver switching means for selecting groups of said filtered signals in accordance with said equivalent matrix, means for combining each selected group of filtered signals, and means for comparing the combined groups of filtered signals with respect to each other for determining the data item transmitted.

3. A system for communicating data items comprising transmitter means, receiver means, transmitting and receiving transducer means coupled to said transmitter and receiver means respectively, said transmitter means comprising oscillator bank means for providing a plurality of signals, each signal having a unique frequency, transmitter switching means for selecting groups of signals from said plurality of signals, said groups representative of said data items respectively, said groups of signals being associated with said respective data items by a modulation matrix derived from a matrix equivalent to a substantially Hadamard matrix in normal form, means for energizing said transmitting transducer means with a signal corresponding to the combined signals in a selected group, said receiver means comprising filter bank means responsive to said receiving transducer means for filtering the received signal in accordance with each of the frequencies provided by said oscillator bank means and providing filtered signals in accordance therewith, receiver switching means for selecting groups of said filtered signals in accordance with said modulation matrix, means for combining each selected group of filtered signals, and means for comparing the combined groups of filtered signals with respect to each other for determining the data item transmitted.

4. The system of claim 3 in which said modulation matrix is derived from said Hadamard matrix by deleting the one row of said matrix that has all elements the same, and appending to the rows of the resulting matrix the complements thereof.

5. The system of claim 2 in which said means for energizing includes means for selecting said group in accordance with said data item to be transmitted, and means for summing the signals in said selected group.

6. The system of claim 2 in which said means for combining comprises summing means.

7. The system of claim 2 in which said means for comparing comprises means for selecting the maximum of said combined groups.

* * * * *